(12) United States Patent
Wosner et al.

(10) Patent No.: US 12,481,629 B1
(45) Date of Patent: Nov. 25, 2025

(54) TWO-FOLD VENDOR DE-DUPLICATION VIA NODE EMBEDDINGS

(71) Applicant: INTUIT INC., Mountain View, CA (US)

(72) Inventors: Omer Wosner, Tel Aviv (IL); Hadas Baumer, Tel Aviv (IL); Yair Horesh, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/674,738

(22) Filed: May 24, 2024

(51) Int. Cl.
*G06F 16/215* (2019.01)
*G06F 16/28* (2019.01)

(52) U.S. Cl.
CPC .......... *G06F 16/215* (2019.01); *G06F 16/285* (2019.01); *G06F 16/288* (2019.01)

(58) Field of Classification Search
CPC ..... G06F 16/215; G06F 16/285; G06F 16/288
See application file for complete search history.

(56) References Cited

U.S. PATENT DOCUMENTS

| | | | |
|---|---|---|---|
| 11,928,423 B1 * | 3/2024 | Eliyahu | G06F 40/274 |
| 2017/0228454 A1 * | 8/2017 | Bose | G06Q 40/02 |
| 2021/0166179 A1 * | 6/2021 | Pande | G06Q 30/0643 |
| 2023/0316186 A1 * | 10/2023 | Miller | G06F 40/40 |
| | | | 705/7.25 |
| 2025/0165529 A1 * | 5/2025 | Annamalai | G06N 20/00 |

OTHER PUBLICATIONS

Ebraheem et al., "Distributed Representaitons of Tuples for Entity Resolution", arXiv:1710.00597v6 [cs.DB] Nov. 18, 2019, 14 pages.
Li et al., "Deep Entity Matching with Pre-Trained Language Models", arXiv:2004:00584v3 [cs.DB] Sep. 2, 2020, 15 pages.
Masui, "Entity Resolution: Identifying Real-World Entities in Noisy Data", Towards Data Science, https://towardsdatascience.com/entity-resolution-identifying-real-world-entities-in-noisy-data-3e8c59f4f41c, Sep. 21, 2023, 52 pages.
Rezayi et al., "EDGE: Enriching Knowledge Graph Embeddings with External Text", arXiv:2104.04909v1 [cs.CL] Apr. 11, 2021, 10 pages.

* cited by examiner

*Primary Examiner* — Jared M Bibbee
(74) *Attorney, Agent, or Firm* — DLA PIPER LLP US

(57) ABSTRACT

A system for vendor deduplication. The system creates embeddings of entity names and creates an initial entity graph comprising entities whose embeddings are related. The initial entity graph includes nodes representing the entity names linked together by edge weights indicating their similarity. The system adjusts the edge weights between the entity names according to transactional data related to the entities to create a final entity graph and merges the entity names as a common entity based on the adjusted edge weights in the final entity graph.

18 Claims, 8 Drawing Sheets

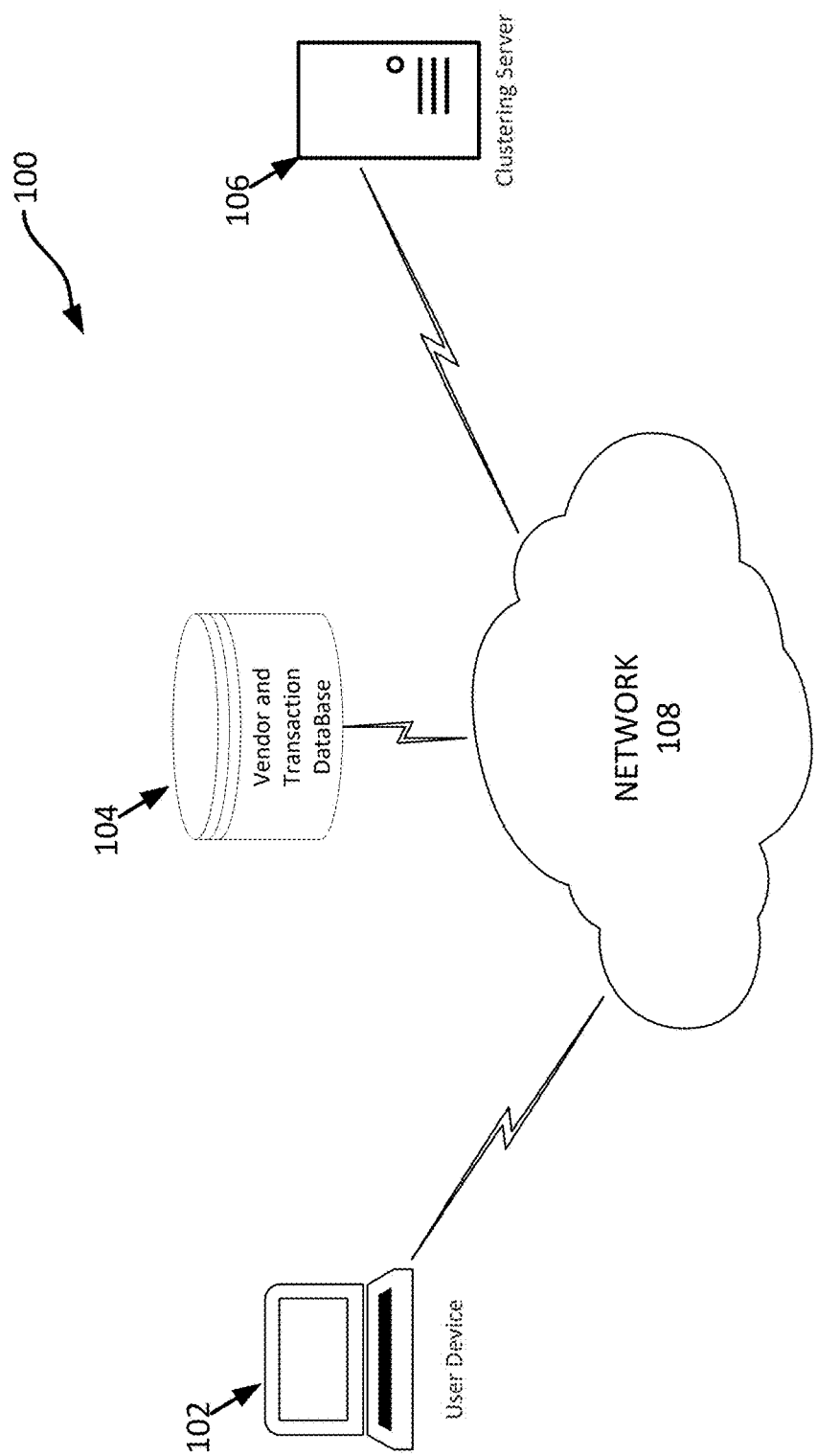

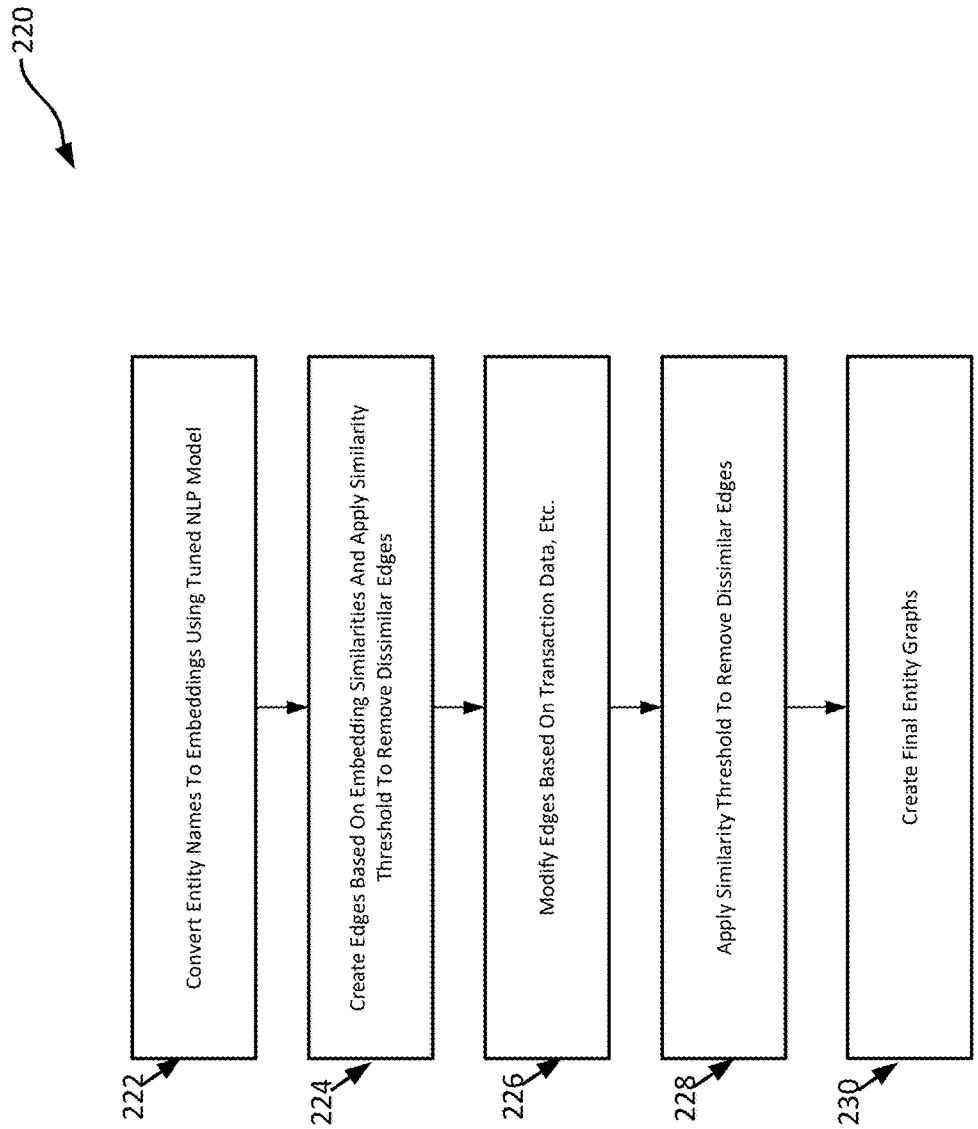

TWO-FOLD VENDOR DE-DUPLICATION VIA NODE EMBEDDINGS

BACKGROUND

Vendors play a role in the field of data management, particularly in the context of financial transactions. Vendors are entities that supply goods or services in exchange for payment. In a typical business scenario, a multitude of vendors interact with a multitude of customers. These interactions are often recorded and stored in databases for various purposes such as e.g., accounting, auditing, and business analytics. One of the challenges in managing such databases is the identification and representation of the vendors. Vendors may be referred to by different names by different users or in different contexts. For instance, a single vendor could be referred to as "VendorName Inc.", "VendorName", or "VendorName Corporation" or any variation. This variability in naming can lead to the same vendor being treated as separate entities in the database, which can cause inaccuracies in data analysis and inefficiencies in data management. All of which are undesirable.

SUMMARY

Embodiments disclosed herein solve the aforementioned technical problems and may provide other technical solutions as well. Contrary to conventional techniques, the disclosed solution includes a novel method of two-fold vendor deduplication via node embeddings.

An example embodiment includes a system for vendor deduplication, comprising a data transformation module including a large language model (LLM) configured to create embeddings of entity names, a clustering module configured to create an initial entity graph comprising entities whose embeddings are related, the initial entity graph including nodes representing the entity names linked together by edge weights indicating their similarity, a recalibration module configured to adjust the edge weights between the entity names according to transactional data related to the entities to create a final entity graph, and a merging module configured to merge the entity names as a common entity based on the adjusted edge weights in the final entity graph.

An example embodiment includes a method for vendor deduplication, comprising transforming data by including a large language model (LLM) configured to create embeddings of entity names, clustering by creating an initial entity graph comprising entities whose embeddings are related, the initial entity graph including nodes representing the entity names linked together by edge weights indicating their similarity, recalibrating by adjusting the edge weights between the entity names according to transactional data related to the entities to create a final entity graph, and merging by merging the entity names as a common entity based on the adjusted edge weights in the final entity graph.

BRIEF DESCRIPTION OF THE DRAWINGS

So that the present disclosure can be understood in detail, a more particular description of the disclosure, briefly summarized above, may be made by reference to example embodiments, some of which are illustrated in the appended drawings. It is to be noted, however, that the appended drawings illustrate only example embodiments of this disclosure and are therefore not to be considered limiting of its scope, for the disclosure may apply to other equally effective example embodiments.

FIG. 1 is a block diagram of a vendor deduplication system, according to aspects of the present disclosure.

FIG. 2B is a process outlining a method for creating entity graphs in a vendor deduplication system based on the network in FIG. 2A, according to aspects of the present disclosure.

DETAILED DESCRIPTION OF SEVERAL EMBODIMENTS

Figure 2A:
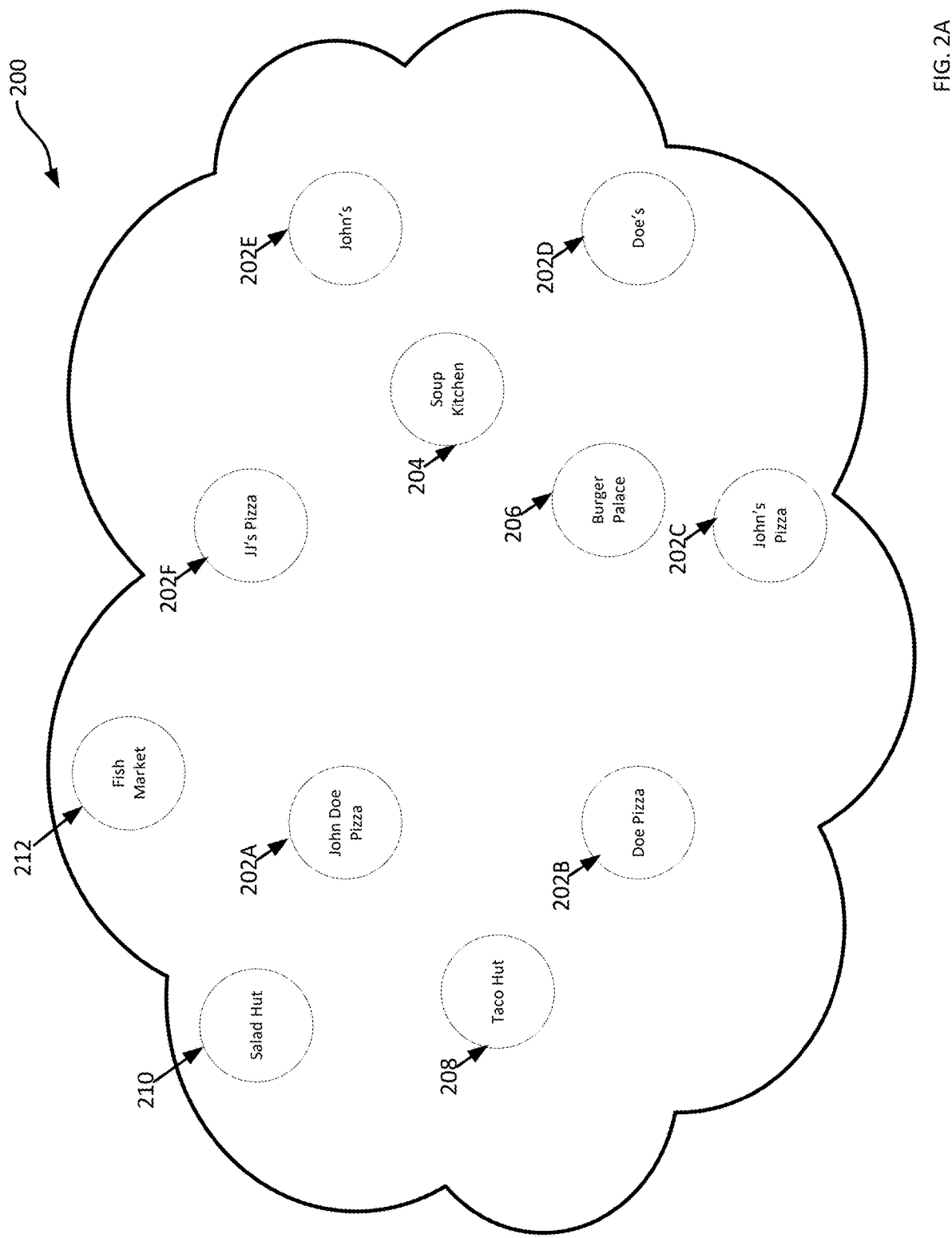
FIG. 2A is a network graph illustrating the relationships between various vendor nodes, according to aspects of the present disclosure.

Various example embodiments of the present disclosure will now be described in detail with reference to the drawings. It should be noted that the relative arrangement of the components and steps, the numerical expressions, and the numerical values set forth in these example embodiments do not limit the scope of the present disclosure unless it is specifically stated otherwise. The following description of at least one example embodiment is merely illustrative in nature and is in no way intended to limit the disclosure, its application, or its uses. Techniques, methods, and apparatuses as known by one of ordinary skill in the relevant art may not be discussed in detail but are intended to be part of the specification where appropriate. In the examples illustrated and discussed herein, any specific values should be interpreted to be illustrative and non-limiting. Thus, other example embodiments may have different values. It is noted that similar reference numerals and letters refer to similar items in the figures, and once an item is defined for one figure, it is possible that it need not be further discussed for the other figures.

In addressing challenges faced by bookkeeping software customers who deal with a vast array of vendors, the disclosed solution addresses the problem of inconsistent vendor naming for the same vendor. Customers may refer to the same vendor by various names, leading to the erroneous treatment of a single vendor as multiple entities. This inconsistency hampers the ability to identify the market's common vendors, which is beneficial for establishing efficient money transfer processes with these vendors.

The disclosed solution solves the above-mentioned problem by identifying and consolidating duplicate vendor references into a singular entity representation. The disclosed solution introduces a "two-fold" graphical embedding process that encompasses the transformation of vendor names into new representations using a language model fine-tuned on vendor names, the creation of potential entity graphs based on the similarity of these embeddings, and the recalibration of edge weights within these graphs. This recalibration is informed by the graph structure and additional data sources, leading to the update of entity graphs into calibrated versions. Consequently, vendors within the same graph are merged into a single entity, thereby streamlining the identification process.

The disclosed solution includes several steps. Initially, vendor names are embedded using a tuned natural language processing (NLP) model trained on a dataset of vendor names. This dataset may include pairs of names that may represent the same or different entities, allowing the model to discern close similarities between names that refer to the same entity. Following this, the disclosed solution clusters the embeddings by creating an adjacency matrix with weights that reflect the similarity between names, adjusting weights below a threshold to zero to form potential real-world entity clusters. As name similarity alone may not be sufficient, the process is further refined by recalibrating edges using additional data sources. This may include transforming transaction text into semantic embeddings and comparing these across potential vendors to update existing weights. The disclosed solution may consider transactions with the same external vendor to update weights. The recalibration process is enhanced by propagating weights according to connectivity, utilizing methods to strengthen or weaken connections based on shared connectivity. The final step involves creating the final entity graphs by removing edges below a selected threshold, resulting in graphs that represent a unified entity with detected name appearances.

The disclosed solution is an improvement over existing entity resolution algorithms, which often require extensive all-against-all comparisons, by focusing on a primary source with higher penetration and assigning different weights to various sources. Unlike "block search" methods that rely on simple heuristics, the solution search space is defined by proximity to other nodes. Additionally, the disclosed solution enriches knowledge graphs with text similarity embeddings, combining several sources with different reliability weights. The disclosed solution may prioritize text similarities from two dimensions to a shared weight and add cases where the connection is considered as "ground truth." The disclosed solution also uses text embeddings as a starting point for other comparisons, rather than building them in parallel and then merging. This approach ensures that vendors with very similar names that lack transactions will still share an entity graph, while those with significantly different names will not be grouped together, regardless of transactional similarities.

As mentioned above, the present disclosure relates to a system and method for vendor deduplication, particularly in the context of large datasets where vendors may be referred to by different names. The disclosed system and method leverage a graphical embedding process referred to herein as a "two-fold" graphical embedding process configured to vendor names as well as additional non-name data (e.g., transaction data, etc.) to identify and merge duplicates of the same vendor references into a single entity representation, where on their face the duplicates may have different identifying features (e.g. names) for the same entity. This process involves transforming vendor names into embeddings using a language model, creating potential entity graphs based on the similarity of these embeddings (i.e., similarities between the names), recalibrating the edges of these graphs using additional data sources (e.g., transaction data), and updating the entity graphs to create calibrated entity graphs (i.e., link non-matching vendor names as being the same vendor based on the additional data sources).

The disclosed system and method offer several benefits. For instance, they provide a more accurate and efficient way of identifying common vendors among a large pool of vendors, which is a challenge in many industries due to the different naming conventions used by different users. By accurately identifying common vendors, businesses can target these vendors more effectively, such as targeting vendors to provide services such as efficient money transfer processes and improved business relationships.

Consider, for example, a scenario where customers have listed transactions with vendors (e.g., in their bookkeeping software) named "VendorName Inc.", "VendorName", and "VendorName Corporation". Although these names do not exactly match, the disclosed system and method would process these vendor names through the two-fold graphical embedding process, resulting in these different vendor names being recognized as a single vendor entity. This would enable bookkeeping software to accurately identify VendorName as a common vendor among its customers, despite the different variations in names used to refer to VendorName. This accurate identification of common vendors can lead to more targeted and efficient business strategies, benefiting both bookkeeping software and its customers.

Referring now to FIG. 1, a block diagram of a vendor deduplication system 100 is depicted. The vendor deduplication system 100 may include a user interaction device 102, a vendor transaction database 104, a data clustering server 106, and a communication network 108. The user interaction device 102 may serve as an interface for users to interact with the vendor deduplication system 100. In some cases, the user interaction device 102 may be a computer, a tablet, a smartphone, or any other suitable device capable of receiving user input and communicating with the vendor deduplication system 100.

The vendor transaction database 104 may store transactional data related to various vendors. This transactional data may include, but is not limited to, vendor names, transaction amounts, transaction dates, transaction types and other relevant information. In some cases, the vendor transaction database 104 may be configured to receive and store a voluminous quantity of vendor names and transactions, ensuring precise identification and consolidation of duplicate vendor records.

The data clustering server 106 may be configured to process the transactional data stored in the vendor transaction database 104 to identify and merge duplicate vendor entries. In some cases, the data clustering server 106 may utilize a large language model (LLM) to create embeddings of entity names, as will be described in more detail below. The data clustering server 106 may also be configured to create an initial entity graph comprising nodes representing entities, with edges corresponding to similarity scores between the nodes based on their embeddings, and to adjust these similarity scores according to transactional data related to the entities to create a final entity graph.

The communication network 108 may facilitate the exchange of data between the user interaction device 102, the vendor transaction database 104, and the data clustering server 106. The communication network 108 may be any suitable network, such as a local area network (LAN), a wide area network (WAN), the Internet, or a combination thereof.

In some variations, the vendor deduplication system 100 may be designed to process a voluminous quantity of vendor names and transactions, ensuring precise identification and consolidation of duplicate vendor records. This may be particularly beneficial in scenarios where a large number of vendors are involved, and where different users may refer to the same vendor by different names (e.g., formal names, informal names, use or exclusion of acronyms, etc.). It is noted that in some examples, the process may ensure that that vendors with substantially similar names such that their edge is above the threshold will still share a connection, even if they don't have any transactions. By accurately identifying and merging duplicate vendor entries, the vendor deduplication system 100 may facilitate more efficient and targeted business strategies and as such is a dramatic improvement over traditional methods and systems.

To understand the process performed by the disclosed system, consider an example where the vendor deduplication system 100 coordinates its components to resolve the identity of a vendor known by multiple names. Transactional data including vendor names such as "VendorTech Solutions," "VendorTech Svc.," and "V-Tech Solutions" may be input into the system, for example, by user interaction device (e.g., computer) 102. This data is transmitted via the communication network 108 to the vendor transaction database 104, which stores the information. The data clustering server 106 retrieves this data and employs its LLM to transform the vendor names into embeddings, revealing their semantic similarities. By creating an initial entity graph, the server identifies potential duplicate entities based on the similarity of these embeddings. The system further refines the graph by recalibrating edge weights using additional transactional data, such as payment frequencies and amounts, to establish stronger links between entities that represent the same vendor. The final entity graph, which consolidates the various names into a single vendor identity, is communicated back to the user interaction device 102, providing the user with a unified view of the vendor's transactions across the different naming conventions. This coordination ensures that "VendorTech Solutions," "VendorTech Svc.," and "V-Tech Solutions" are accurately recognized as the same entity, streamlining data management and analytics.

It is noted that the hardware devices shown in FIG. 1 may include various "modules" which may be hardware, software or a combination of both hardware and software. The disclosure references such modules when describing the functionality of the system.

FIGS. 2A, 2B, 3A, 3B, 4A, and 4B collectively describe the deduplication method with respect to example network diagrams and flowcharts, illustrating the intricate process of identifying, clustering, and merging vendor entities that may have been recorded under various names. These figures visually represent the transformation of vendor names into embeddings, the creation of initial entity graphs based on these embeddings, the recalibration of connections using transactional data, and the finalization of entity graphs that accurately reflect deduplicated vendor identities. Through these diagrams and flowcharts, an example method is detailed step-by-step, showcasing the system's ability to navigate through complex data and refine vendor relationships for precise deduplication.

FIG. 2A shows a network graph 200 illustrating the relationships between various vendor nodes. The network graph 200 is a visual representation of a simplified network of vendors that may include a John Doe Pizza node 202A, a Doe Pizza node 202B, John's Pizza node 202C, a Doe's node 202D, John's node 202E, and JJ's Pizza node 202F. These nodes represent vendor names that have similar names, but may or may not be the same vendor. Other nodes in the network graph 200 may include a Soup Kitchen node 204, Burger Palace node 206, Taco Hut node 208, Salad Hut node 210, and Fish Market node 212, which may represent vendor names that have somewhat distinct names that do not appear to correlate to one another.

As mentioned above, a goal of the vendor deduplication system 100 may be to determine which of these nodes (if any) belong to a cluster of a common vendor. The clustering module of the data clustering server 106 may generate the initial entity graph by constructing an adjacency matrix with the edge weights indicative of the similarity between the entity names. The edge weights may be indicative of the similarity between the embeddings of the entity names generated by the data transformation module using the LLM which is a model trained on a vast dataset of vendor names. In some cases, the clustering module may apply a similarity threshold to the adjacency matrix, setting the edge weights below the threshold to zero to eliminate weak connections. These embeddings capture the semantic essence of the vendor names, allowing for a nuanced comparison of their similarities. This may result in the formation of initial clusters of nodes that represent potential real-world entities and their connections.

In some instances, the clustering module may apply a similarity threshold to the adjacency matrix. This threshold serves as a cut-off point, below which edge weights are deemed too weak to indicate a meaningful connection between nodes. By setting these edge weights to zero, the clustering module effectively eliminates weak connections from the graph. This process results in the formation of initial clusters of nodes, each cluster representing a potential real-world entity and the connections between its various manifestations. This step is a part of the vendor deduplication process, as it lays the groundwork for the subsequent steps of edge recalibration and final entity graph creation.

The clustering process is enhanced by considering not just the similarity of vendor names but also the transactional similarity between the nodes. The edges between nodes are computed and updated to identify clusters that represent the same real-world entities. This comprehensive approach involves the use of additional data sources, such as transactional text and vendor-related transactional data, to recalibrate the edge weights in the initial entity graph. By incorporating this transactional layer, the system adds a dimension of similarity that goes beyond mere lexical resemblance, allowing for a more nuanced and accurate clustering based on shared transactional behaviors and patterns.

In some aspects, the creation of potential entity graphs is a two-tiered process. Initially, the embedding similarity edge creation step 224 (FIG. 2B) involves generating potential entity graphs composed of vendors whose embeddings—vector representations of their names—are closely related. These potential entity graphs are based on the similarity of the embeddings of the entity names, which are generated by the data transformation module using the LLM. Subsequently, an additional layer of similarity is applied by incorporating transactional data, which serves to further refine the clustering by revealing transactional relationships and patterns that may not be apparent from name similarity alone. This dual-layered approach ensures a more robust and contextually informed deduplication process. It is noted that in some examples, name similarity and transactional similarities may be considered simultaneously.

Referring now to FIG. 2B, a process 220 outlining a method for creating final entity graphs in a vendor deduplication system based on the network in FIG. 2A is now described. The process 220 generally begins with the conversion of entity names to embeddings using a tuned NLP model, referred to herein as the entity name to embedding conversion step 222. Embeddings may be numerical vector representations of entity names generated by a language model, capturing semantic nuances and enabling similarity comparisons for deduplication. In some cases, the NLP model used for this conversion may be a BERT-based model fine-tuned on a dataset comprising vendor names. This tuned model may be better at capturing the nuances of vendor naming conventions, reducing the emphasis on irrelevant semantic meanings. In other variations, a naive BERT model trained on a dataset of vendor names may be used for this data transformation.

The process 220 proceeds to the creation of edges based on embedding similarities and the application of a similarity threshold to remove dissimilar edges, referred to herein as the embedding similarity edge creation step 224. In the context of the vendor deduplication system, edges represent the connections between nodes in the entity graph, quantified by weights that indicate the degree of similarity between the vendor names associated with those nodes. In this step, each vendor name has an edge with another name if their embeddings' similarity is higher than a chosen threshold. Pairs are aggregated together, resulting in an adjacency matrix with weights that represent the similarity between the names. Weights that are below the threshold are changed to zero, thus enabling them to split into multiple adjacency matrices, each holding potential real-world entities and their connections. In some variations, the clustering module may apply a similarity threshold to the adjacency matrix, setting the edge weights below the threshold to zero to eliminate weak connections.

The edges are modified based on transaction data and other relevant information, referred to herein as the edge modification based on data step 226. In this step, the recalibration module modifies the edge weights based on non-textual relationships derived from additional data sources. These additional data sources may comprise transactional text and vendor-related transactional data. In some cases, the recalibration module converts transactional memos into semantic embeddings and adjusts the edge weights by comparing the semantic embeddings across different vendors. Examples of transactional data that can be used include, but are not limited to, Invoice and Payment Histories: Patterns in invoicing and payment timelines can indicate relationships between entities, such as consistent payment terms or shared invoice numbering systems; Purchase Order Details: Similarities in purchase order contents, such as recurring item descriptions or quantities, can suggest that different vendor names may actually refer to the same entity; Bank Transaction Records: Commonalities in bank account numbers or transaction references used in financial transactions can be strong indicators of vendor identity; Tax Documents: Tax identification numbers or VAT details that match across different vendor records can be used to merge entities; Shipping and Delivery Information: If multiple vendor names share the same shipping addresses or delivery routes, this can imply they are the same entity; Contract Agreements: Overlapping contract dates, terms, or signatories can reveal connections between seemingly separate vendors. Additional data sources that can be leveraged include but are not limited to Communication Logs: Email exchanges or phone call records that show interactions between vendors and customers can help in identifying common points of contact; External Databases: Cross-referencing with external business registries or credit bureaus can validate if different vendor names are associated with the same legal entity; Social Media and Online Presence: Analyzing social media profiles or websites where multiple vendor names point to the same online content or contact information; Customer Feedback and Reviews: Aggregating customer reviews that mention different vendor names but describe similar experiences or products; Marketplace Data: Data from online marketplaces where vendors sell their products can be analyzed for similarities in product listings or seller profiles.

After the edge modification based on data step 226, a similarity threshold is applied again to remove dissimilar edges, referred to herein as the dissimilar edge removal step 228. This step involves removing edges that fall below a specific similarity threshold, resulting in distinct graphs for each real-world entity. The threshold for creating final entity graphs may be manually selected for each dataset or there may be a general guideline for setting this threshold.

The process 220 proceeds with the creation of final entity graphs, referred to herein as the final entity graph creation step 230. In this step, the merging module consolidates the entity names into a unified entity by removing the edge weights below a predetermined threshold in the final entity graph. In other words, for the final entity graph creation step 230, the merging module is designed to consolidate the various entity names into a single, unified entity. This consolidation is achieved by removing the edge weights that fall below a predetermined threshold in the final entity graph. The threshold is a chosen value that determines which connections are strong enough to be preserved in the final graph. Connections with weights below this threshold are deemed too weak to indicate a meaningful relationship between the entities and are therefore removed. Each final entity graph that is created in this step represents a single, unified vendor entity. This graph holds the different name appearances that have been detected for this vendor throughout the deduplication process. These name appearances could include formal names, informal names, abbreviations, or any other identifiers used to refer to the vendor. By consolidating these different names into a single entity, the system provides a more accurate and coherent representation of the vendor.

In some variations, although not shown, the process 220 may be further enhanced by utilizing a method such as the Louvian method for propagating weights according to connectivity. This method may help to strengthen the connections between real-world entities and weaken them between those which are not. The Louvain method, a community detection method used in network analysis, can be employed to enhance the process of vendor deduplication. This method is particularly useful in the context of large and complex networks, where it can efficiently identify communities of nodes based on the structure of the network. In the context of vendor deduplication, these communities can be interpreted as clusters of vendor names that likely refer to the same real-world entity. The Louvain method operates by optimizing a measure known as modularity, which quantifies the strength of division of a network into communities. The method starts with each node in its own community and iteratively merges communities in a way that maximizes the increase in modularity. The process is repeated for the resulting community structure, leading to a hierarchical decomposition of the network into communities at different scales. In the vendor deduplication process, the Louvain method can be used to propagate weights according to connectivity, effectively strengthening the connections between vendor names that are part of the same community and weakening them between those which are not. This can help to refine the entity graphs, ensuring that vendor names that refer to the same entity are accurately grouped together, while those that refer to different entities are kept separate. By incorporating the Louvain method into the vendor deduplication process, the system can leverage the structure of the network of vendor names to enhance the accuracy and efficiency of the deduplication process. This can be particularly beneficial in scenarios involving large datasets with complex naming conventions, where traditional methods may struggle to accurately identify and merge duplicate vendor entries.

Figure 3A:
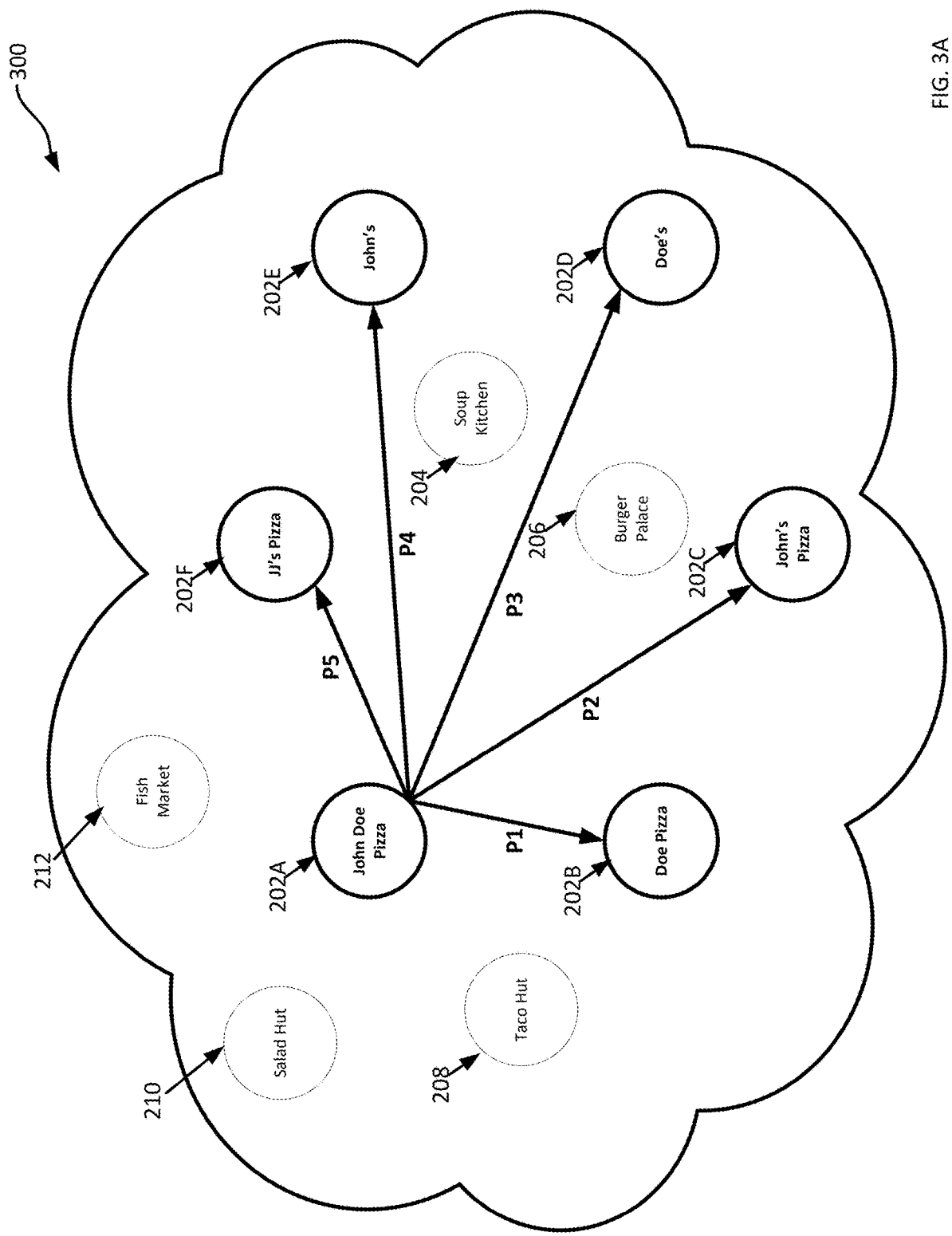
FIG. 3A is a network graph illustrating the relationships between various vendor nodes and their connections, according to aspects of the present disclosure.

Referring now to FIG. 3A, a network graph 300 is depicted, illustrating the edges (i.e., similarity relationships) between various vendor nodes and their connections. The john doe pizza node 202A is centrally connected to the doe pizza node 202B via connection line P1, John's Pizza node 202C via connection line P2, Doe's node 202D via connection line P3, John's node 202E via connection line P4 and JJ's Pizza node 202F via connection line P5. These connection lines P1, P2, P3, P4 and P5 may represent edges with similarity weights between the nodes. The lines indicate an initial cluster between these nodes due to name similarity.

In FIG. 3A, the network graph 300 provides a visual representation of the relationships between various vendor nodes, which are entities in the graph that represent different vendor names. The edges, represented by connection lines P1, P2, P3, P4, and P5, are the links between these nodes. These edges are not just arbitrary connections; they represent similarity relationships between the vendor nodes they connect. The strength of these relationships is quantified by similarity weights, which are numerical values assigned to each edge. These weights reflect the degree of similarity between the vendor names associated with the connected nodes, as determined by the similarity of their embeddings.

The network graph 300 shows that the "John Doe Pizza" node 202A is centrally connected to several other nodes, including "Doe Pizza" node 202B, "John's Pizza" node 202C, "Doe's" node 202D, "John's" node 202E, and "JJ's Pizza" node 202F. These connections suggest that these vendor names have a high degree of similarity, as indicated by their shared central node and the presence of edges between them. This group of interconnected nodes forms an initial cluster, which is a potential grouping of vendor names that may refer to the same real-world entity.

It's worth noting that while the connections between "John Doe Pizza" and the other nodes in the cluster are explicitly shown in the graph, there are also connections between other nodes within the cluster. This is because each node in the cluster is connected to other nodes in the cluster, albeit with varying degrees of similarity. Some of these connections may have relatively low similarity weights, indicating that the associated vendor names are not as similar to each other as they are to "John Doe Pizza". These less similar connections are not depicted in the graph for the sake of clarity, but they are nonetheless part of the overall network of relationships within the cluster.

Figure 3B:
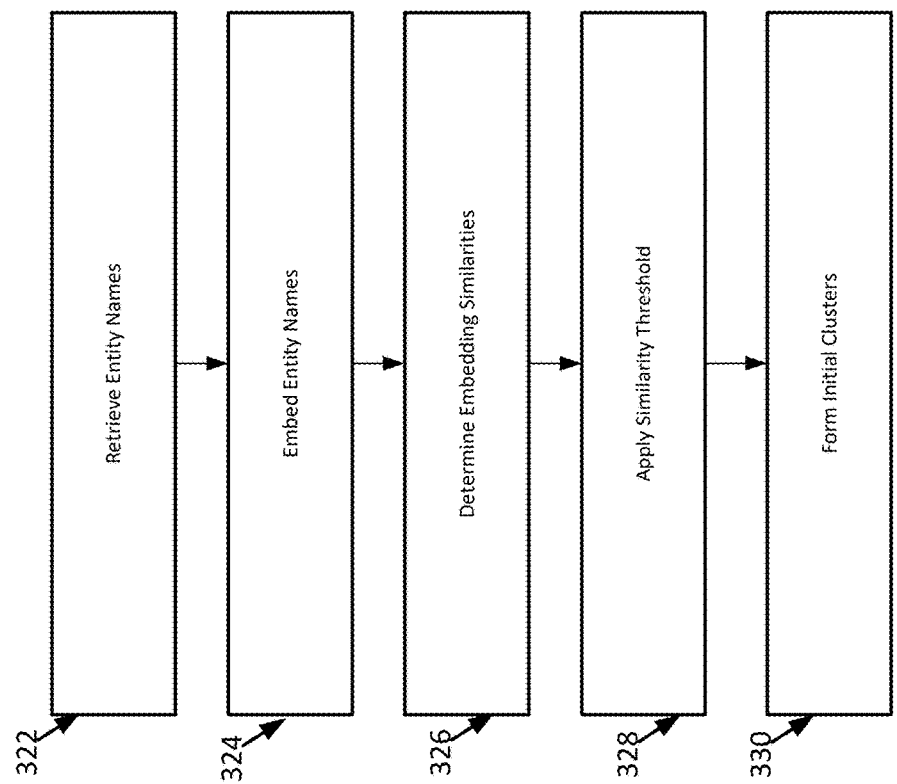
FIG. 3B is a process outlining a method for processing entity names in a deduplication system according to the cluster network shown in FIG. 3A, according to aspects of the present disclosure.

Referring now to FIG. 3B, a process 320 outlining a method for processing entity names in a deduplication system according to the cluster network shown in FIG. 3A is now described. The process 320 begins with the entity name retrieval step 322, where entity names are collected for processing. In some cases, the entity names may be retrieved from a vendor transaction database, such as vendor transaction database 104, which stores transactional data related to various vendors. The entity names may include, but are not limited to, vendor names, aliases, abbreviations, or any other identifiers used to refer to the vendors.

The process 320 proceeds to the entity name embedding step 324. In this step, the retrieved entity names are converted into numerical vector representations, known as embeddings. This conversion may be performed using an LLM, such as a BERT-based model fine-tuned on a dataset comprising vendor names. In some variations, a naive BERT model trained on a dataset of vendor names may be used for this data transformation. The use of such a model may help capture the nuances of vendor naming conventions, reducing the emphasis on irrelevant semantic meanings.

The process 320 includes the embedding similarity determination step 326. In this step, the degree of similarity between the embeddings of the entity names is calculated. This similarity calculation may be based on various metrics, such as cosine similarity, Euclidean distance, or any other suitable similarity measure. The results of this calculation may be used to assess which entity names might refer to the same real-world entity.

Following the embedding similarity determination step 326, the process 320 performs the similarity threshold application step 328. In this step, a predefined threshold is applied to determine which embeddings are similar enough to be considered for clustering. The threshold may be set based on various factors, such as the size of the dataset, the complexity of the vendor naming conventions, or any other relevant considerations. In some cases, the threshold may be manually selected for each dataset, while in other cases, there may be a general guideline for setting this threshold.

The process 320 proceeds with the initial cluster formation step 330. In this step, clusters of entity names are formed based on the results of the similarity assessment. These clusters may represent potential real-world entities and their connections. The formation of these clusters may involve constructing an adjacency matrix with the edge weights indicative of the similarity between the entity names. In some variations, the edge weights may be set to zero for connections that fall below the similarity threshold, effectively eliminating weak connections and resulting in distinct clusters for each real-world entity.

The process 320 depicted in FIG. 3B is used for forming the initial cluster shown in FIG. 3A. Once the similarity between embeddings is established via a method such as e.g., cosine similarity or Euclidean distance to name a few, the process 320 applies a predefined similarity threshold to discern which embeddings are sufficiently similar to be considered for clustering. This threshold is a gatekeeper, ensuring that the system focuses on the entity names that are likely to represent the same vendor. The initial cluster formation step uses the results of the similarity assessment to form clusters of entity names, which are potential representations of real-world entities. By constructing an adjacency matrix and setting edge weights indicative of the similarity between the entity names, the system effectively creates initial clusters. These clusters are visualized in FIG. 3A, where nodes such as the "John Doe Pizza" node 202A are connected to other nodes with similar names, indicating a high degree of similarity and suggesting a common vendor entity.

Figure 4A:
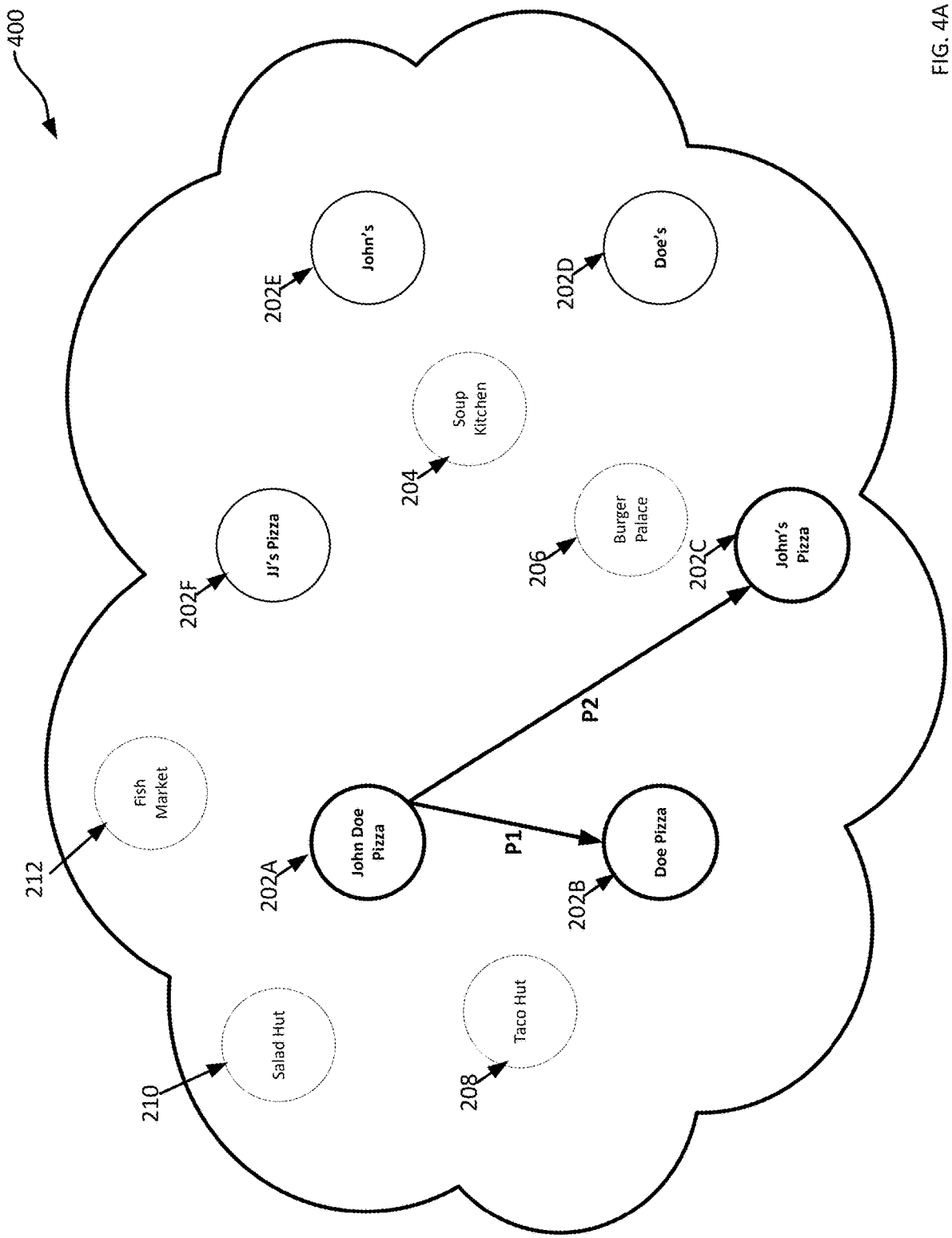
FIG. 4A is a node graph for a vendor deduplication process which updates the edge connections based on transaction data, according to aspects of the present disclosure.

Referring now to FIG. 4A, a node graph 400 for vendor deduplication process is depicted, which updates the name-based edge connections (i.e. initial edges discussed above) based on transaction data. In FIG. 4A, John Doe Pizza node 202A is connected to Doe Pizza node 202B by connection line P1 and John's Pizza node 202C by connection line P2, indicating a relationship or similarity between these vendor names. The connection lines P3, P4, and P5 have been removed because updating the connections based on transactional data weakened these connections. In other words, Doe's, John's, and JJ's pizza are determined not to be the same entity as John Doe Pizza as uncovered by their lack of similar transaction data. In other words, the system's analysis indicates that despite the lexical similarities in their names, Doe's, John's, and JJ's Pizza maintain distinct transactional profiles that do not align with those of John Doe Pizza. Consequently, the system segregates these entities, ensuring accurate representation and preventing erroneous data consolidation.

In some aspects, the vendor deduplication system 100 may utilize a recalibration module to modify the edge weights based on non-textual relationships derived from additional data sources. This recalibration process, also referred to as the edge modification based on data step 226, may involve adjusting the edge weights between the entity names according to transactional data related to the entities to create a final entity graph. This recalibration of edges based on graph structure and non-textual relations using additional data sources may help to refine the connections between vendors, allowing the vendor deduplication system 100 to merge duplicates and create a more coherent and accurate representation of vendor entities.

In the recalibration of edge weights, the system employs transactional data and other relevant data sources to refine the initial connections established by name-based similarities. This process, beneficial to the edge modification based on data step 226 (FIG. 2B), leverages additional layers of information, such as transaction frequencies, monetary values, and types of transactions, to recalibrate the weights of the edges in the entity graph. By incorporating this transactional layer, the system adds a dimension of similarity that goes beyond mere lexical resemblance, allowing for a more nuanced and accurate clustering based on shared transactional behaviors and patterns. This recalibration ensures that the final entity graph more accurately represents the real-world connections between vendors, facilitating the merging of duplicate entities into a single, unified vendor profile.

For example, the recalibration module may convert transactional memos into semantic embeddings and adjust the edge weights by comparing the semantic embeddings across different vendors. This process may help strengthen the connections between real-world entities and weaken them between those which are not. For instance, vendors with similar names and similar transactions will have strengthened their edges, while those with different ones will weaken. In some examples, the recalibration module may extract features indicative of transactional relationships between the entities, including at least one of frequency of transactions, monetary values, transaction dates, and transaction types, and employs the features to recalculate the edge weights in the initial entity graph. In some examples, the entity names are consolidated into a unified entity by removing the edge weights below a predetermined threshold in the final entity graph. This process ensures that vendors with extremely similar names that don't have any transactions will still share an entity graph. The threshold for creating final entity graphs may be manually selected for each dataset or there may be a general guideline for setting this threshold.

Figure 4B:
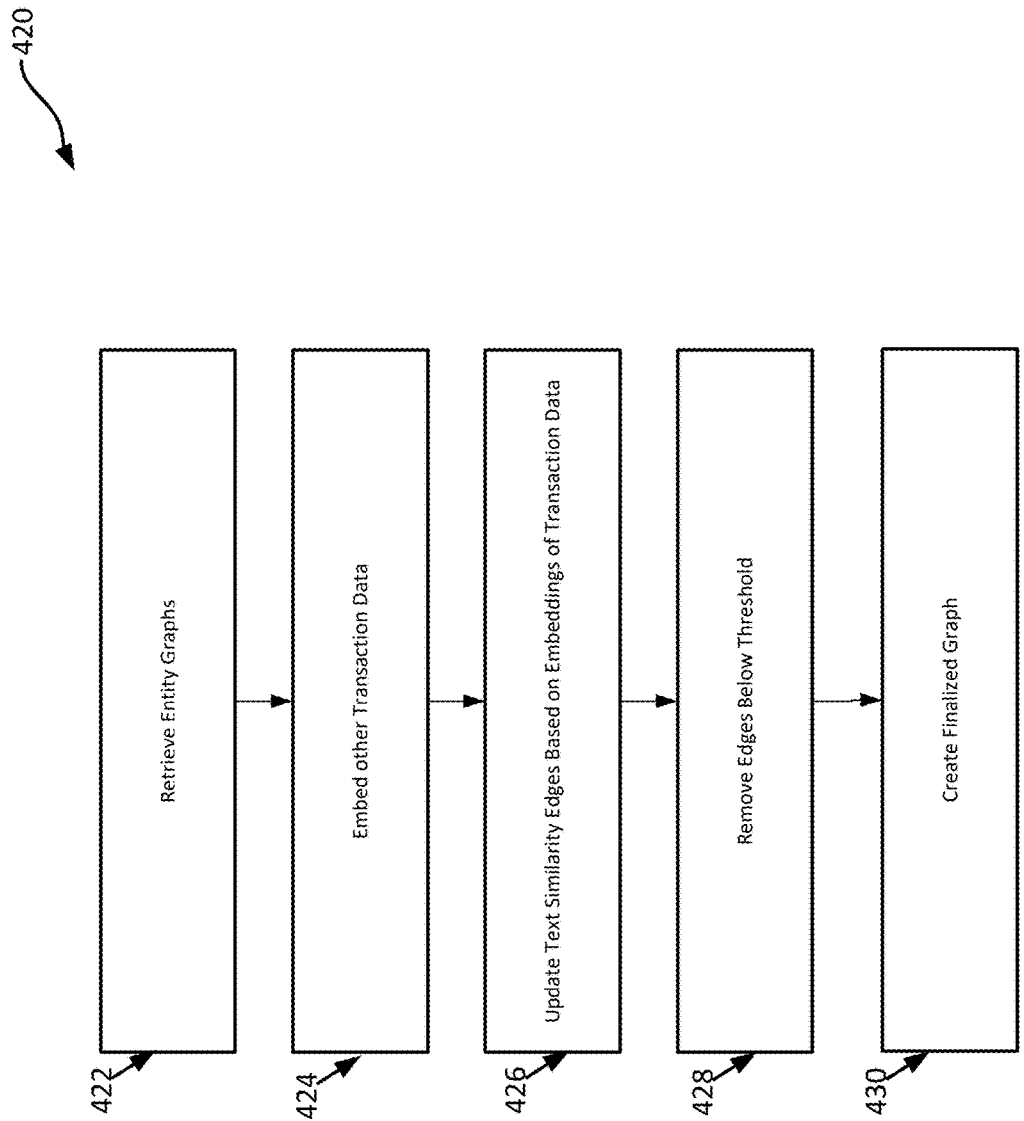
FIG. 4B is a process outlining a method for deduplication of vendor entities as shown in the graph in FIG. 4A, according to aspects of the present disclosure.

Referring now to FIG. 4B, a process 420 outlining a method for deduplication of vendor entities as shown in the network graph in FIG. 4A is now described. The process 420 begins with an entity graphs retrieval step 422, where initial entity graphs are retrieved. These initial entity graphs may be retrieved from a database or other storage medium and may represent the initial clusters of vendor names formed based on the similarity of their embeddings.

The process 420 proceeds to the transaction data embedding step 424. In this step, transaction data related to the entities is embedded to enhance the entity graphs. This transaction data may include, but is not limited to, transaction amounts, transaction dates, and other relevant information. The transaction data is transformed into semantic embeddings, which capture the essence of the transaction data and allow for a deeper understanding of the transactions associated with each vendor.

Transaction data embedding step 424 may involve a process where transactional data is transformed into semantic embeddings. This is achieved by utilizing an LLM to analyze and convert transactional information—such as transaction amounts, dates, and types—into high-dimensional vector space representations. These semantic embeddings encapsulate the contextual and transactional nuances of the data, enabling the system to discern patterns and relationships that are not immediately apparent from the raw data. By embedding transactional data in this manner, the system can compare and contrast the transactional behaviors of different vendors, thereby refining the entity graph with a richer, more informed layer of transactional similarity. For example, transactional embeddings may be combined with initial name-based embeddings to refine the embeddings used to compute the edges between the nodes.

The process 420 performs the text similarity edges update step 426. In this step, edges in the graph are updated based on the text similarity of the embedded transaction data. This involves comparing the semantic embeddings of the transaction data across different vendors and updating the edge weights accordingly. Vendors with similar names and similar transactions will have their edges strengthened, while those with different ones will have their edges weakened.

Following the text similarity edges update step 426, the process 420 involves the edges removal step 428. In this step, edges that fall below a specific similarity threshold are removed, which helps to refine the entity graph. This threshold may be manually selected based on a sample dataset, or it may be determined based on other factors such as the size and complexity of the dataset.

The process 420 proceeds with the finalized graph creation step 430. In this step, a finalized graph is created, representing deduplicated vendor entities. The connections between nodes in the finalized graph are established based on both name similarity and transaction similarity that exceed a predefined threshold. This dual-criteria approach ensures that the final entity graph not merely reflects lexical resemblances but also encapsulates transactional commonalities, thereby providing a robust and accurate consolidation of vendor identities. The edges in this graph signify meaningful relationships where vendors share not just similar naming conventions but also exhibit parallel transactional patterns, reinforcing the integrity of the deduplication process.

The incorporation of transactional similarities into the deduplication process plays a role in mitigating the risk of false positives, where entities with similar names are incorrectly merged. By analyzing transactional data, such as payment histories, purchase order details, and bank transaction records, the system can discern distinct transactional patterns that are characteristic of individual vendors. This analysis is particularly effective in distinguishing between entities that may share a name but operate independently, as their transactional footprints will reveal divergent behaviors.

For instance, two vendors with the name "Acme Supplies" may have vastly different transaction frequencies, monetary values, and client bases, which the system can identify and use to maintain their separation in the final entity graph. This transactional layer acts as a safeguard, ensuring that the deduplication process is not misled by name similarity alone and that each vendor entity is represented accurately in the database.

Furthermore, the final entity graph is refined through a process that emphasizes transactional congruence over mere textual similarity. Vendors that engage in similar transactions, evidenced by comparable transaction amounts, dates, and types, will have their connections within the graph strengthened. Conversely, vendors with dissimilar transactional profiles will see their connections weakened or removed. This dynamic adjustment of edge weights based on transactional data ensures that the final entity graph represents a network of vendors that are not just nominally similar but are substantively linked through their business activities.

In a practical use case, a customer operating a transactional payment system may want to streamline its operations by targeting vendors that have a substantial number of transactions for inclusion into their system. The customer's objective is to focus on entities that not merely exist in its database but are also actively engaged in frequent business activities, as these are the vendors that would benefit from an integrated payment solution.

To achieve this, the customer can utilize the vendor deduplication system 100 to analyze its transactional data. The system's recalibration module would play a role in this scenario. By leveraging the recalibration process, the system can identify vendors that not just have similar names but also exhibit a high frequency of transactions. The recalibration module would extract transactional features such as the frequency of transactions, monetary values, and transaction types, and use these features to adjust the edge weights in the entity graph.

For example, if the system identifies multiple vendor entries such as "XYZ Supplies," "XYZ Supply Co.," and "XYZ Industrial Supplies," it would initially link these entities based on name similarity. However, the recalibration process would further analyze the transactional data associated with these entries. If the data reveals that "XYZ Supplies" and "XYZ Supply Co." have a high volume of transactions while "XYZ Industrial Supplies" has a negligible transactional footprint, the system would adjust the edge weights to reflect this. Consequently, "XYZ Supplies" and "XYZ Supply Co." would be merged into a single entity due to their strong transactional correlation, while "XYZ Industrial Supplies" would remain separate.

By applying a threshold that prioritizes transactional frequency, the customer can ensure that the final entity graph includes clusters of vendor entities that are not just nominally similar but are also active participants in the market. This targeted approach allows the customer to focus their efforts on integrating vendors into their payment system that will likely see a benefit and usage, thereby optimizing the efficiency and effectiveness of their transactional operations.

It is noted that machine learning, as discussed above, is beneficial to the vendor deduplication system, playing a role in data transformation, clustering, and edge calibration, which are part of the system's ability to accurately identify and merge duplicate vendor entities.

For example, in the data transformation phase, machine learning, particularly the use of an LLM, is employed to convert vendor names into numerical vector representations known as embeddings. These embeddings are high-dimensional and capture the semantic nuances of the vendor names, which are often complex and varied due to different naming conventions and abbreviations used across datasets. The LLM's ability to understand and encode the context of the vendor names into embeddings is beneficial for the subsequent steps of the deduplication process. For example, machine learning algorithms such as Convolutional Neural Networks (CNNs) and Recurrent Neural Networks (RNNs) can be utilized to process and convert textual data into embeddings. CNNs are particularly effective in capturing local patterns within the text, while RNNs, including Long Short-Term Memory (LSTM) networks, are adept at handling sequences and can capture the context in longer strings of text, which is beneficial for understanding complex vendor names and their variations.

Machine learning algorithms are also used to analyze the embeddings and determine the similarity between different vendor names. By constructing an adjacency matrix with edge weights that reflect these similarities, the system can form initial clusters of vendor names. Machine learning algorithms are adept at handling the vast and complex data involved in this process, enabling the system to scale and maintain high performance even when processing large datasets. The clustering step is particularly challenging because it may determine which similarities are meaningful and which are coincidental, a task that machine learning algorithms excel at by learning from the data itself. For example, algorithms like k-means clustering, hierarchical clustering, and DBSCAN (Density-Based Spatial Clustering of Applications with Noise) can be employed to group similar embeddings. These algorithms can handle the high-dimensional space of embeddings and identify natural clusters based on the similarity of vendor names. Additionally, spectral clustering can be used to identify clusters based on the eigenvalues of the similarity matrix, which can be particularly useful when the clusters are not spherical or when the dataset is large.

Machine learning algorithms also recalibrate the edge weights between vendor names by analyzing non-textual relationships derived from transactional data, such as payment frequencies, monetary values, and transaction types. This step is where machine learning proves to be beneficial, as it can process and analyze large volumes of transactional data to uncover patterns and relationships that are not evident from the vendor names alone. By converting transactional memos into semantic embeddings and comparing these across different vendors, the system can adjust the connections in the entity graph to more accurately reflect real-world entities. For example, machine learning algorithms such as Gradient Boosting Machines (GBMs) and Random Forests to analyze transactional data and adjust the edge weights in the entity graph. These ensemble learning methods combine multiple weak predictive models to form a strong predictor, which can handle the complexity and non-linearity of transactional relationships. Support Vector Machines (SVMs) can also be used for recalibration, especially when the transactional data is not linearly separable, as they are effective in finding the hyperplane that maximizes the margin between different classes of data.

Figure 5:
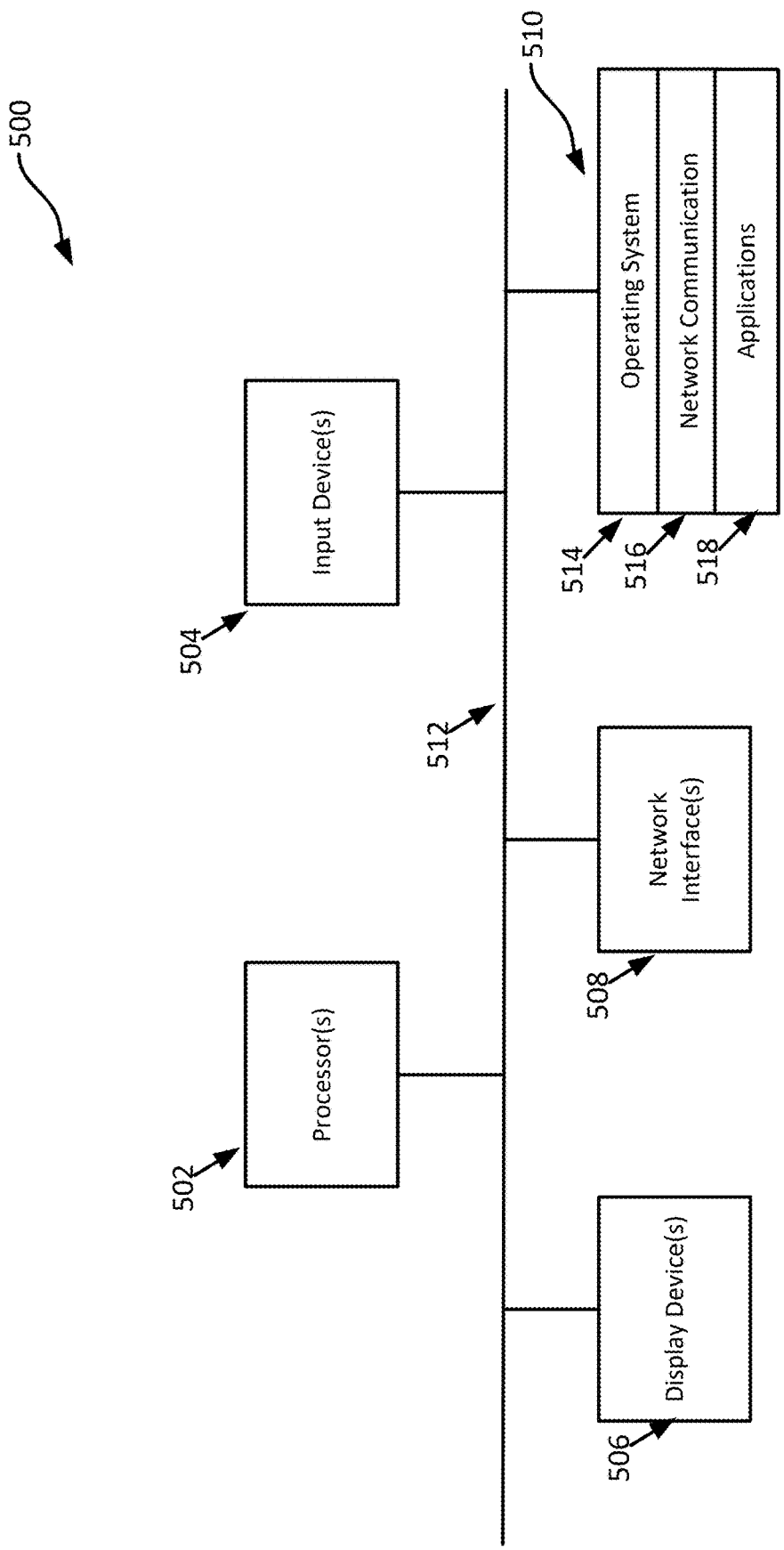
FIG. 5 is a block diagram of a computing system which is an example of a computing system implemented by the devices shown in FIG. 1, according to aspects of the present disclosure.

Referring now to FIG. 5, a block diagram of a computing system 500 is depicted. The computing system 500 may be an example of a computing system implemented by the devices shown in FIG. 1. The computing system 500 may include a processing unit 502, input peripherals 504, a display component 506, networking hardware 508, a software platform 510, and a system bus 512. The processing unit 502 may be centrally connected to various components of the system via the system bus 512. The processing unit 502 may be responsible for executing instructions of a computer program to perform operations of the vendor deduplication system 100. In some cases, the processing unit 502 may include one or more processors, each configured to execute instructions stored in a memory of the computing system 500. The input peripherals 504 may interface with the processing unit 502 to provide user input capabilities. The input peripherals 504 may include devices such as a keyboard, a mouse, a touch screen, or any other suitable input device that allows a user to interact with the computing system 500. In some cases, the input peripherals 504 may be used to input vendor names or other relevant data into the vendor deduplication system 100. The display component 506 may present visual output to a user. The display component 506 may include a monitor, a screen, a projector, or any other suitable display device. In some cases, the display component 506 may present a graphical user interface (GUI) that allows a user to interact with the vendor deduplication system 100.

The networking hardware 508 may facilitate connectivity with other systems and networks. The networking hardware 508 may include devices such as a network interface card (NIC), a modem, a router, or any other suitable networking device. In some cases, the networking hardware 508 may enable the computing system 500 to connect to a communication network 108, facilitating the exchange of data between the user interaction device 102, the vendor transaction database 104, and the data clustering server 106. The software platform 510 may encompass the operating system 514, which provides the foundational system operations, networking software 516 that manages network communications, and application software 518 that includes programs and utilities for various tasks. The software platform 510 may be stored in a memory of the computing system 500 and executed by the processing unit 502. In some cases, the application software 518 may include the vendor deduplication system 100.

Each of these elements is interconnected, illustrating the flow of data and control signals between the hardware and software components of the computing system 500. This interconnectedness allows the computing system 500 to perform the operations of the vendor deduplication system 100, including the transformation of vendor names into embeddings, the creation of potential entity graphs, the recalibration of edges, and the creation of final entity graphs.

In some variations, the computing system 500 may be configured to handle a large number of vendor names and transactions, ensuring precise identification and consolidation of duplicate vendor records. This may be particularly beneficial in scenarios where a large number of vendors are involved, and where different users may refer to the same vendor by different names. By accurately identifying and merging duplicate vendor entries, the computing system 500 may facilitate more efficient and targeted business strategies.

While the foregoing is directed to example embodiments described herein, other and further example embodiments may be devised without departing from the basic scope thereof. For example, aspects of the present disclosure (e.g. modules) may be implemented in hardware or software or a combination of hardware and software. One example embodiment described herein may be implemented as a program product for use with a computer system. The program(s) of the program product defines functions of the example embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the disclosed example embodiments, are example embodiments of the present disclosure.

It will be appreciated by those skilled in the art that the preceding examples are not limiting. It is intended that permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed:

1. A system for vendor deduplication, comprising:
   a processor; and
   a memory device storing programming instructions that when executed by the processor configure the processor to:
   use a large language model (LLM) to create embeddings of entity names;
   create an initial entity graph comprising entities whose embeddings are related, the initial entity graph comprising nodes representing the entity names linked together by edge weights indicating similarity between the entities;
   adjust the edge weights between the entity names according to transactional data related to the entities to create a final entity graph the transactional data comprising at least one of frequency of transactions, monetary values, transaction dates, and transaction types; and merge the entity names as a common entity in the final entity graph by identifying related clusters of the nodes according to the adjusted edge weights.

2. The system of claim 1, wherein the LLM is a BERT-based model fine-tuned on a dataset comprising vendor names.

3. The system of claim 1, wherein the wherein the processor generates the initial entity graph by constructing an adjacency matrix with the edge weights indicative of the similarity between the entity names.

4. The system of claim 3, wherein the processor applies a similarity threshold to the adjacency matrix, setting the edge weights below the threshold to zero to eliminate weak connections.

5. The system of claim 1, wherein the processor modifies the edge weights based on non-textual relationships derived from additional data sources.

6. The system of claim 5, wherein the additional data sources comprise transactional text and vendor-related transactional data.

7. The system of claim 6, wherein the processor converts transactional memos into semantic embeddings and adjusts the edge weights by comparing the semantic embeddings across different vendors.

8. The system of claim 1, wherein the processor consolidates the entity names into a unified entity by removing the edge weights below a predetermined threshold in the final entity graph.

9. The system of claim 1, wherein the processor utilizes a community detection method to propagate the edge weights according to connectivity within the initial entity graph, the community detection method utilizing modularity to identify communities of nodes based on the structure of the network, thereby refining the entity graphs to represent the clusters of vendor entities that correspond to the same real-world entity.

10. A method for vendor deduplication, comprising:
transforming data by including a large language model (LLM) configured to create embeddings of entity names,
clustering by creating an initial entity graph comprising entities whose embeddings are related, the initial entity graph including nodes representing the entity names linked together by edge weights indicating similarity between the entities;
recalibrating by adjusting the edge weights between the entity names according to transactional data related to the entities to create a final entity graph the transactional data comprising at least one of frequency of transactions, monetary values, transaction dates, and transaction types; and
merging by merging the entity names as a common entity in the final entity graph by identifying related clusters of the nodes according to the adjusted edge weights.

11. The method of claim 10, wherein the LLM is a BERT-based model fine-tuned on a dataset comprising vendor names.

12. The method of claim 10, wherein the clustering involves generating the initial entity graph by constructing an adjacency matrix with the edge weights indicative of the similarity between the entity names.

13. The method of claim 12, wherein the clustering further involves applying a similarity threshold to the adjacency matrix, setting the edge weights below the threshold to zero to eliminate weak connections.

14. The method of claim 10, wherein the recalibrating modifies the edge weights based on non-textual relationships derived from additional data sources.

15. The method of claim 14, wherein the additional data sources comprise transactional text and vendor-related transactional data.

16. The method of claim 15, wherein the recalibrating includes converting transactional memos into semantic embeddings and adjusting the edge weights by comparing the semantic embeddings across different vendors.

17. The method of claim 10, wherein the merging consolidates the entity names into a unified entity by removing the edge weights below a predetermined threshold in the final entity graph.

18. The method of claim 1, wherein the processor utilizes a community detection method to propagate the edge weights according to connectivity within the initial entity graph, the community detection method utilizing modularity to identify communities of nodes based on the structure of the network, thereby refining the entity graphs to represent clusters of vendor entities that correspond to the same real-world entity.

* * * * *